(12) United States Patent  
Karpik (10) Patent No.: US 8,020,342 B2
(45) Date of Patent: Sep. 20, 2011

(54) AG-WAFER PRODUCT AND METHOD OF MAKING SAME

(75) Inventor: Joseph Karpik, Floodwood, MN (US)

(73) Assignee: Mat, Inc., Floodwood, MN (US)

( * ) Notice: Subject to any disclaimer, the term of this patent is extended or adjusted under 35 U.S.C. 154(b) by 809 days.

(21) Appl. No.: 11/703,914

(22) Filed: Feb. 8, 2007

(65) Prior Publication Data

US 2007/0283620 A1   Dec. 13, 2007

Related U.S. Application Data

(60) Provisional application No. 60/811,917, filed on Jun. 8, 2006, provisional application No. 60/722,022, filed on Feb. 10, 2006.

(51) Int. Cl.
*A01G 7/00* (2006.01)

(52) U.S. Cl. .............................................. 47/9

(58) Field of Classification Search ............ 47/59 S, 47/58.1 SC
See application file for complete search history.

(56) References Cited

U.S. PATENT DOCUMENTS

| | | | | |
|---|---|---|---|---|
| 1,376,553 A | 5/1921 | Lander | ............... | 428/473 |
| 1,672,537 A | 6/1928 | Novak | ............... | 428/473 |
| 2,019,824 A * | 11/1935 | Liehr et al. | ............... | 71/24 |
| 2,381,774 A | 8/1945 | Riefenstahl | ............... | 264/122 |
| 2,483,405 A | 10/1949 | Francis, Jr. | ............... | 154/54 |
| 2,757,150 A | 7/1956 | Heritage | ............... | 260/17.2 |
| 3,010,161 A | 11/1961 | Duvall | ............... | 19/156 |
| 3,026,242 A | 3/1962 | Emery | ............... | 162/146 |
| 3,269,824 A * | 8/1966 | Aswell | ............... | 71/7 |
| 3,308,218 A | 3/1967 | Wiegand et al. | ............... | 264/121 |
| 3,577,312 A | 5/1971 | Videen et al. | ............... | 162/148 |
| 3,876,411 A * | 4/1975 | Fowler | ............... | 71/11 |
| 3,947,316 A | 3/1976 | Kremr et al. | ............... | 162/129 |
| 3,972,092 A | 8/1976 | Wood | ............... | 19/156.3 |
| 4,265,954 A | 5/1981 | Romanek | ............... | 428/85 |
| 4,353,946 A | 10/1982 | Bowers | ............... | 428/109 |
| 4,418,031 A | 11/1983 | Doerer et al. | ............... | 264/241 |
| 4,474,846 A | 10/1984 | Doerer et al. | ............... | 428/284 |
| 4,580,960 A | 4/1986 | Apman et al. | ............... | 425/81.1 |
| 4,635,576 A | 1/1987 | Bowers | ............... | 112/403 |
| 5,096,748 A | 3/1992 | Balassa | ............... | 427/384 |
| 5,158,809 A * | 10/1992 | Proctor | ............... | 428/23 |
| 5,195,465 A | 3/1993 | Webb et al. | ............... | 119/172 |
| 5,224,290 A | 7/1993 | Molnar et al. | ............... | 47/56 |
| 5,226,255 A | 7/1993 | Robertson | ............... | 47/56 |
| 5,330,828 A | 7/1994 | Jacobsen, Jr. et al. | ............... | 428/286 |
| 5,345,713 A | 9/1994 | Molnar et al. | ............... | 47/56 |
| 5,346,514 A | 9/1994 | Molnar et al. | ............... | 47/1.01 F |

(Continued)

FOREIGN PATENT DOCUMENTS

DE    29710483 U1 * 10/1998

(Continued)

OTHER PUBLICATIONS

F. Rodrigues, Principles of Polymer Systems, Table A5-2, pp. 538-539, 1982.

(Continued)

*Primary Examiner* — Francis T Palo (74) *Attorney, Agent, or Firm* — Vidas, Arrett & Steinkraus (57) ABSTRACT

A compressed wafer mulch, the compressed wafer mulch including corn stover fibers, paper fibers, compost or a mixture thereof, and a method of making the same.

20 Claims, 2 Drawing Sheets

U.S. PATENT DOCUMENTS

| | | | | |
|---|---|---|---|---|
| 5,443,612 | A * | 8/1995 | Havens | 71/5 |
| 5,456,733 | A | 10/1995 | Hamilton, Jr. | 47/58 |
| 5,459,181 | A | 10/1995 | West et al. | 524/35 |
| 5,484,501 | A | 1/1996 | Jacobsen, Jr. et al. | 156/209 |
| 5,490,351 | A | 2/1996 | Molnar et al. | 47/56 |
| 5,585,150 | A | 12/1996 | Sheehan | 428/15 |
| 5,585,161 | A | 12/1996 | Difloe et al. | 428/109 |
| 5,720,129 | A | 2/1998 | Lantinberg | 47/56 |
| 6,029,395 | A | 2/2000 | Morgan | 47/9 |
| 6,164,011 | A | 12/2000 | Gaudreault et al. | 47/9 |
| 6,254,654 | B1 | 7/2001 | Van Barneveld | 71/8 |
| 6,264,879 | B1 | 7/2001 | Addie et al. | 264/518 |
| 6,286,253 | B1 | 9/2001 | Decker | 47/56 |
| 6,293,045 | B1 | 9/2001 | Morgan | 47/9 |
| 6,349,499 | B1 | 2/2002 | Spittle | 47/9 |
| 6,360,478 | B1 | 3/2002 | Spittle | 47/9 |
| 6,401,390 | B1 | 6/2002 | Labbe et al. | 49/9 |
| 6,523,299 | B2 | 2/2003 | Morris | 47/9 |
| 6,829,860 | B1 | 12/2004 | Lee et al. | 47/9 |
| 2002/0184816 | A1 * | 12/2002 | Philipson | 44/589 |
| 2004/0065005 | A1 * | 4/2004 | Morris | 47/9 |
| 2007/0283620 | A1 * | 12/2007 | Karpik | 47/9 |

FOREIGN PATENT DOCUMENTS

| | | |
|---|---|---|
| DE | 102004019815 A1 * | 11/2005 |
| GB | 1118163 | 7/1965 |
| GB | 1185623 | 4/1967 |
| GB | 1088991 | 10/1967 |
| GB | 1171941 | 11/1969 |
| GB | 1581486 | 12/1980 |
| JP | 10139575 A * | 5/1998 |
| KR | 2006020557 A * | 3/2006 |
| WO | WO00/75379 A1 | 12/2000 |

OTHER PUBLICATIONS

*BioEconomy Update* a-t Iowa State University of May 2002.

* cited by examiner

Fig. 2.

AG-WAFER PRODUCT AND METHOD OF MAKING SAME

CROSS-REFERENCE TO RELATED U.S. PATENT APPLICATIONS

This application claims the benefit of U.S. Provisional Patent Application Ser. No. 60/811,917 filed Jun. 8, 2006 and U.S. Provisional Patent Application Ser. No. 60/722,033 filed Feb. 10, 2006, each of which is incorporated by reference herein in its entirety.

FIELD OF THE INVENTION

The present invention relates to a mixture of corn stover fibers, paper fibers, compost and/or mulch for use in erosion control, and more specifically, to a product for use in erosion control which is in the form of a compressed wafer.

BACKGROUND OF THE INVENTION

Conventional processes for producing revegetation/erosion controlling pellets already exist. Most known processes utilize various wood, paper, straw, synthetic fibers and blends thereof which are then compressed into pellets. The pellets are used in drop spreaders and/or hydraulic mulching machines in areas to promote the desired revegetation or erosion control.

An example of a process for producing an ag-fiber pellet is disclosed in U.S. Pat. No. 4,369,597 which identifies a process for making pelletized mint mulch utilizing the mint plant residue from production of mint oil as a primary feed stock. The mint plant residue is formed into pellets and the resultant pellets are then crumbled. Pelletizing compresses the mint fibers which greatly reduces pellet bulk, and subsequent crimping then promotes separability of the pellets to facilitate consumption or use within an alternative agricultural application. Crumbling fractures the pellets so that they will more readily break apart and absorb water. Crumbled mint mulch can be used in both a dry form, and as a slurry for spray application by a hydro-mulching machine.

Mulch which may include compost is largely biodegradable and is formed of chopped or shredded vegetation which is used to enhance germination of seeds. As the seeds germinate, the mulch slowly degrades delivering nutrients to the surrounding soil to promote plant growth. U.S. Pat. No. 6,523,299 discloses a mulch comprising paper particles and corn particles. The paper and corn particles are intimately mixed into a substantially uniform mulch and may be compressed into a pellet form.

Another example of a pelletized mulch is disclosed in U.S. Pat. No. 5,456,733 wherein mulching pellets are formed from waste paper scrap by incorporating particulate, water-insoluble, swellable, gel-forming polymer into the pellet-forming composition. The formed pellets swell and disintegrate after being spread and impregnated with water, to increase their area of ground-coverage, to release any included nutrients or seeds, and to deposit polymer particles having water-absorbing properties.

U.S. Pat. No. 6,829,860 discloses a pelletized straw mulch for soil stabilization and grass and wild flower seed enhancement.

To date, however, no compressed wafer product is known which combines the beneficial qualities of the various sources of mulch or compost into a single mulch product. It would be beneficial to provide a mulch product in the form of a compressed wafer which combines various sources, and which has had wider application range, including livestock feed, erosion control, revegetation, potting purposes, for bare root plants, and other agricultural purposes.

Corn stover is made from the corn plant, including the stalk and leaves but excludes the corn kernel, tassel and cob. Corn stover is a main waste product of the corn producing industry.

Current approaches to recycling corn waste materials are limited and usually include an initial chopping step followed by the spreading of the chopped corn waster over the field, or tilling the corn waste material under the surface of the soil to decompose. Alternatively, the corn waste may be processed and ensiled as silage for livestock feed.

It would be beneficial to employ corn stover with paper, wood, natural fibers, synthetic fibers, polymers, wood shavings, wood fibers, dairy compost, yard waste compost, other compost, soybean straw, oat hulls, alfalfa (Hoy), and other types of straw and/or grain hulls, as a wafered mulch product, which can be used for livestock, erosion control, revegetation, potting purposes, for bare root plants, and/or other agricultural purposes.

Without limiting the scope of the invention a brief summary of some of the claimed embodiments of the invention is set forth below. Additional details of the summarized embodiments of the invention and/or additional embodiments of the invention may be found in the Detailed Description of the Invention below.

SUMMARY OF THE INVENTION

In a broad sense, the present invention relates to a compressed wafer formed from corn stover, and paper fibers, mulch and/or compost, and methods of making and using the same.

In one aspect, the present invention relates to a compressed wafer made from ag-fiber, specifically corn stover fiber and cellulose paper fiber, wood or other natural or synthetic fibers.

In one aspect, the compressed wafer includes corn stover and cellulose paper.

In another embodiment, the compressed wafer includes corn stover, cellulose paper and compost.

Any suitable compost material may be employed herein. Almost any organic material is a suitable source of compost. Examples of suitable sources of compost include, but are not limited to, livestock refuse including buffalo and cattle manure; yard waste including, but not limited to, leaves, wood chips, grass clippings, pine needles and so forth; kitchen refuse including, but not limited to, melon rinds, carrot peelings, tea bags, apple cores, banana peels and so forth; garden refuse including, but not limited to, spent plants, thinned seedlings, and deadheaded flowers; hay and straw; wood ashes; and seaweed. The hay may also be alfalfa. The straw may be from various sources including wheat and soy beans.

The above-identified list is intended for illustrative purposes only, and is not intended as a limitation on the scope of the present invention.

In one aspect, the present invention provides a compressed wafer mulch formed from recycled harvested corn plant waste, paper, mulch, compost, and other materials including fibers.

The corn stover material may be mixed with a variety of optional ingredients. Optional ingredients which may be incorporated into the wafer product may include, but are not necessarily limited to, paper, wood, wood shavings, wood fibers, bonding fibers, adhesive compositions, resins, thermoplastic resins, thermo-setting resins, hot melt adhesives, waxes, wetting agents, colorants, perfumes, netting, inoculants, preservatives, fire retardants, synthetic fibers, or other natural fibers, polyester and copolymers thereof, polyamide and copolymers thereof, polyolefin and copolymers thereof, acetate, rayon, cotton, leather, wool, coconut, kanaffe and jute, mulch, dairy compost, yard waste compost, other compost, soy bean straw, oat hulls, alfalfa (hoy), and other natural AG products and mixtures of any of the above. One or more of these optional ingredients may be incorporated within the corn stover fibers by blending or mixing for example.

In one embodiment, the compressed wafer may be formed of approximately 25% paper, 73% corn stover fibers, and 2% polymer fibers.

In at least one embodiment, the compressed wafer may be formed of approximately 25% wood shavings, and 75% corn stover fibers.

In at least one embodiment, the compressed wafer may be formed of approximately 25% wood fiber and 75% corn stover fibers.

In another embodiment, the compressed wafer product may be formed of approximately 25% dairy compost, yard waste compost, and/or other compost and 75% corn stover fibers.

In at least one embodiment, the compressed wafer may be formed of approximately 25% yard waste compost and 75% corn stover fibers.

In another embodiment, the compressed wafer product may be formed of approximately 25% soy bean straw and 75% corn stover fibers.

In yet another embodiment the compressed wafer product may be formed of approximately 50% wood fibers, 15% paper, 60% corn stover fibers, and 2% polymer fibers.

In at least one embodiment, the compressed wafer product may be formed of approximately 50% alfalfa (hoy) and approximately 50% corn stover fibers.

Additional types of compost may include, but are not necessarily limited to buffalo manure, cattle manure, as well as other types of compost.

In at least one other embodiment the AG fiber wafer product may include bean stubble and other compositions of bean fiber materials.

In another aspect, the present invention relates to methods of forming the compressed wafer mulch according to the invention.

In at least one embodiment, the compost material may be added and mixed with a pellet as formed by a pelleting machine for subsequent pressing into the AG fiber wafer product.

In one aspect, the present invention relates to a process for producing a compressed wafer with corn stover, paper, and compost material, the process including the steps of harvesting the corn stover and thermo-mechanical defibrating the corn stover.

In one embodiment, the method involves the steps of providing a corn stalk material, defibrating the corn stalk material to form corn stover fibers, and mixing the corn stover fibers with paper and/or compost and other optional materials such as synthetic fibers, and/or other suitable natural fibers, resins, adhesives, dyes, perfumes, etc. as desired.

In at least one embodiment, the process may be a substantially dry process of forming a wafer product from corn stover, mulch, compost, and other fibers wherein the corn stover material or corn stover fibers never reach a moisture content greater than about 25% weight to about 30% weight. Such an embodiment therefore employs limited amounts of water relative to other processes in which a slurry of the recycled waste product is prepared.

The use of the longer corn stover fibers rather than corn stover particles provides a wafer product which blankets the ground more effectively and retains seed, soil and fertilizer better due to the longer fiber lengths.

The further processing of a pellet to form a wafer increases the ability of the mulch to absorb water rapidly. In addition, in alternative embodiments, the wafer style mulch requires less mixing time when used as a slurry for hydraulic style mulching.

The use of corn stover as a raw material constitutes a value added product option to the grain, specifically corn, producer.

The use of corn stover is also beneficial to the consumer because corn stover has a high carbon to nitrogen ratio. Commonly used mulching mediums such as wood, paper, and straw may absorb nutrients from the surrounding soil at the beginning of the composting process, essentially borrowing nutrients from the soil. Then, as a mulching medium degrades the mulch slowly release those same nutrients back into the surrounding soil until degradation is complete. As corn stover degrades, on the other hand, it borrows fewer nutrients from the surrounding soil due to the high carbon to nitrogen ratio.

The compressed wafer formed herein may be biodegradable.

The wafer can be used for a variety of agricultural and landscaping purposes including as a livestock feed, for erosion control, for revegetation, for potting purposes, for bare root plants, etc.

These and other aspects, embodiments and advantages of the present invention will be apparent to those of ordinary skill in the art upon review of the Detailed Description and Claims to follow.

DETAILED DESCRIPTION OF THE INVENTION

While this invention may be embodied in many different forms, there are described in detail herein specific embodiments of the invention. This description is an exemplification of the principles of the invention and is not intended to limit the invention to the particular embodiments illustrated. The present invention may be embodied in other specific forms without departing from the spirit or essential attributes thereof; and it is, therefore, desired that the present embodiment be considered in all respects as illustrative and not restrictive, reference being made to the appended claims.

All published documents, including all US patent documents, mentioned anywhere in this application are hereby expressly incorporated herein by reference in their entirety. Any copending patent applications, mentioned anywhere in this application are also hereby expressly incorporated herein by reference in their entirety.

The present invention relates to a wafer which may be employed for a variety of purposes such as for livestock feed, for revegetation, for erosion control, for potting purposes, for bare root plants, and other horticultural or agricultural purposes, and to methods of making and using the same.

The wafer may be formed using recycled harvested corn plant waste, paper, mulch and/or compost. As used herein, the term "corn stover materials" shall hereinafter be used to refer to the raw, unprocessed materials of the corn plant including the stalk and leaves. Suitably, the corn kernel, tassel and cob are excluded. Suitably, the stalk is cut at a point above the ground so as to avoid contaminants from the soil.

As used herein, the term "corn stover fibers" shall hereinafter be used to refer to the processed materials or defibrated corn stover material. Suitably, the corn kernel, tassel, and cob, are excluded from the process.

The process according to the invention generally includes the step of harvesting the corn stover material, treating the corn stover material to produce corn stover fibers, and mixing the stover fibers with other optional ingredients which may include mulch and/or compost.

Any suitable method of harvesting the corn stover may be employed herein including, but not limited to, stand harvesting and bale harvesting. Suitably, the corn stover is stand harvested. Stand harvesting may provide advantages such as reduced amounts of contaminates over the bale harvesting method. Stand harvesting is advantageous because during harvesting the corn stalk is removed at a point above the ground which reduces the amount of contaminates which are introduced into the process. Contaminates introduced into the process can result in increased wear on machinery and refining parts. Contaminates include, for example, sand, rootballs, small rocks, etc. which may be abrasive to machinery parts resulting in unnecessary wear.

A standing corn crop may be harvested using any suitable method. In one embodiment, the standing corn crop is harvested using a method and apparatus as described in commonly assigned U.S. Pat. No. 5,875,622, the entire content of which is incorporated by reference herein.

Using this method, a John Deere 7700 combine, modified with an integrated corn stalk chopper and rear forage blower is employed. This apparatus allows for adjustable cutting height. Suitably, the stalks are cut so as to leave about 12 inches, to about 15 inches of stalk, embedded in the soil in order to reduce the amount of soil and other contaminants in the collected harvest. The chopper attachments reduce the stalks to varying lengths. Such lengths may be from about ½ inch to about 4 inches although this length may be varied.

Suitably, the harvested corn stover material has a corn grain content of less than about 2 wt-% and a cob content of less than about 25-30 wt-%. Harvests having more than about 2 wt-% corn grain or about 30 wt-% cob content may be re-separated. While such ranges are preferable, the numbers may vary.

The harvested corn stover material may have a moisture content of about 20 wt-% to about 30 wt-% of the harvested corn stover material.

Rapid rehydration, water absorption and retention have been found to be desirable properties of a wafer product according to the invention for some applications. Thus, it may be desirable to retain a certain moisture level in the corn stover material. If the harvested corn stover material is too dry, it is difficult to rehydrate. Corn stover material has a cellular structure. If the internal moisture of the material is lost, the cells form closed bubbles resulting in a material which floats in water, but which itself does not absorb water and rehydrate.

During thermal treatment of corn stover material, the moisture in the cells of the corn stover material expands resulting in bursting of the cell structure which results in openings in the cells. The open cells exhibit improved absorption and rehydration properties, and exhibit improved moisture retention as well, as compared to a closed cell structure, which can occur if the corn stover material does not have enough internal moisture. Thus, in some preferred embodiments of the invention, the corn stover material retains a specific, desirable moisture content during harvesting and processing into a final wafer product.

After harvesting, the corn stover material may be mixed with water, preservatives and inoculants in a process referred to in the industry as ensiling. In a preferred process, the moisture content of the ensiled stover material is between about 30 wt-% and about 70 wt-%. Once ensiled, the corn stover material may be covered tightly to remove any oxygen, and stored in appropriate storage facilities such as cement bunkers to await further processing. For such purposes, it has been found beneficial to preserve the amount of naturally occurring moisture in the plant cells during storage and prior to processing as discussed in some detail above. Thus, the corn stover material may be ensiled wherein additives including, but not limited to, water, inoculants, preservatives, etc. may be incorporated into the stover material for storage.

One example of a suitable inoculant is Silamax® 50G, a lactic acid producing bacteria.

One example of a suitable preservative is dried molasses.

After ensiling, the corn stover material may be reduced to corn stover fibers, mixed with optional ingredients, and formed into a final wafer product.

The corn stover materials may be reduced to stover fibers using any method known in the art. Suitably, the integrity of the starting stover material can be preserved during the reducing process.

Equipment including granulators and/or refiners may be employed to reduce the corn stover materials to stover fibers. Use of a refiner in series with a granulator has been found to increase the volume of stover fibers and improve efficiency. In general, a granulator may reduce the stover materials to any desired size. However, the volume of stover fiber that may be processed through a granulator is typically less than the volume of corn stover that can be processed through a refiner. Thus, for small volume products or processes, a granulator alone can efficiently be used to reduce the corn stover materials to fibers. For larger volume processes, a granulator can initially reduce the size of large corn stover materials and then the smaller corn stover materials can be reduced to stover fibers in a refiner.

Harvesting and processing of corn stover material is discussed in commonly assigned co-pending U.S. patent application Ser. No. 11/143,342 filed Jun. 2, 2005, which claims the benefit of U.S. Provisional Patent Application Ser. No. 60/628,731 filed Nov. 17, 2004, each of which is incorporated by reference herein in its entirety.

In one embodiment of the invention, the corn stover materials are initially reduced in size using a granulator, and then further reduced in length using a refiner. In one embodiment, the corn stover material is reduced to stover fiber using a thermo-mechanical defibrating process wherein the fibers are heat treated.

It is desirable to retain as much of the length of the raw corn stover fibers as possible. Preservation of this length not only provides for easier processing of the fibers into a fibrous corn stover wafer product, but also provides improved properties such as higher strength, weavability, cohesion and stability to the fibrous corn stover wafer product. In general, it has been found that the longer the stover fibers, the more stable the final product because longer fibers are more likely to intertwine with one another during processing which results in higher wafer strength and cohesiveness. However, stover fibers which are too long may entangle with one another and form aggregates which can clog machinery and increase processing time.

The length of the corn stover fibers may generally range from about 0.125 inches to about 1.0 inch in length. Reducing fiber length below about 0.125 inches results in fibers which are too short to produce a wafer product having desirable physical properties, such as tensile strength and durability. Fibers having a length significantly longer than about 1.0 inch can increase the difficulty of processing the fibers into a final wafer product.

It is desirable that the majority of stover fibers have a length of about 0.75 inches to about 1.0 inch as longer fibers are easier to weave into a final wafer product, and produce a stronger more cohesive wafer product.

However, it can be expected in typical process, that the majority of stover fibers may have a length in the range of about 0.25 inches to about 0.50 inches.

Although uniform fiber length is desirable, it is difficult to produce fibers of a uniform length, and in a typical process, fibers having varying lengths may result. For example, some fibers may have a length in the range of about 0.25 inches to about 0.50 inches, some may have a length of greater than 0.5 inches, and some may have a length of less than 0.25 inches.

In a typical embodiment, it may be expected that about 50% to about 60% of the stover fibers have a length between about 0.25 inches and about 0.50 inches.

In one embodiment, it was found that about 50% to about 60% by weight of the fibers had a length in the range of about 0.25 inches to about 0.50 inches, about 20% to about 30% had a length in the range of about 0.125 inches to about 0.25 inches, and about 20% to about 30% had a length in the range of greater than 0.50 inches.

A preferred embodiment may include a mixture of stover fibers wherein about 75 wt-% of the fibers have a length of greater than about 0.50 inches and about 15 wt-% have a length less than about 0.25 inches.

The process, including the steps of forming corn stover fibers from the corn stover material, mixing with optional ingredients, and forming the mixture into a fibrous corn stover product, may be referred to herein as a "substantially dry process" of making a fibrous corn stover product. As used herein, the term substantially dry process shall refer to a process wherein during the processing of the corn stover material into fibers, and finally into a fibrous corn stover product, there is no slurry or waste byproduct that has to be discarded.

A wet fiber slurry is not typically formed using the present invention, as opposed to other processes wherein wet fiber slurries of recycled waster fiber products are processed, although the present invention does not preclude formation of a slurry if desired.

During processing, suitably, the corn stover fibers have a moisture content of no greater than about 25 to about 30 wt-%, and more suitably, the moisture content is between about 5 wt-% to about 25 wt-%, even more suitably about 10 wt-% to about 20 wt-%, and most suitably no greater than about 15 wt-%.

If the fibers have a moisture content of significantly less than about 10 wt-%, it has been found that the fibers become brittle and inflexible, and generate significant amounts of dust. The existence of dust and reduced moisture content for the fibers may increase the risk of the fibers charring or spontaneously combusting. Furthermore, dryer fibers result in wafer product which has less strength and less cohesion, and holes may develop in the final wafer product or the pellets used to form the wafer product may disintegrate during the wafer formation process.

Stover fibers having a moisture content of significantly greater than about 25% result in diminished processing efficiency and increased processing costs.

The corn stover material may be mixed with a variety of optional ingredients. Optional ingredients which may be incorporated into the wafer product include, but are not limited to, adhesives, waxes, wetting agents, colorants, perfumes, netting, inoculants, preservatives, fire retardants, synthetic fibers, other natural fibers, polyester and co-polymers thereof, polyamide and co-polymers thereof polyolefin and co-polymers thereof, acetate, rayon, cotton, leather, wool, coconut, kanaffe and jute, paper, wood, wood shavings, wood fibers, bonding fibers, resins, thermo-plastic resins, thermo setting resins, hot melt adhesives, polyamide and co-polymers thereof, polyolefin and co-polymers thereof, mulch, dairy compost, yard waste compost, other compost, soy bean straw, oat hulls, alfalfa (hay), and other natural AG products, and mixtures of any of the above. One or more of these optional ingredients may be incorporated with the corn stover fibers by blending or mixing, for example.

Optionally, bonding fibers, adhesive compositions or other bonding agents may be incorporated with the corn stover fibers to improve adhesion and therefore cohesion and strength of the final wafer product. Such optional materials may be incorporated using any suitable method known in the art such as by blending, spraying, dipping, brushing, etc.

Polymers

Polymers may optionally be incorporated with the corn stover fibers. These polymers may be thermoplastic or thermosetting in nature. Thermoplastic polymers or resins may have melting temperatures in the range of about 85° F. to about 350° F. This range is intended for illustrative purposes only, and the melting temperature may fall outside of this range for some materials. The resins, as the bonding fibers, may also be added to adhere the fibers together and to therefore increase the durability, stability and cohesion to the final wafer product. They also can be added to improve moldability, particularly the thermoplastic resins or polymers.

Resins useful in the present invention are suitably thermoplastic, and also suitably recyclable. Thermoplastic resins are desirable due to their flexibility, and to the ease of reshaping and recycling thermoplastic resins. Thermoplastic resins may be heated to their molten state during the pressing process, and once solidified, improve the cohesion of the final stover wafer product. The addition of thermoplastic resins or polymers to the composition facilitates molding of the final product into particular shapes and sizes.

Examples of suitable classes of thermoplastic resins or polymers include, but are not limited to, polyamides, co-polyesters, styrene co-polymers, thermoplastic urethanes and polyurethanes, etc. Specific examples of polymers or resins useful herein include, for example thermoplastic polyurethanes commercially available from BASF; thermoplastic polyolefins commercially available from Dow Plastics; styrene block co-polymers commercially available from Dexco Polymers; and thermoplastic polyamides and copolyesters commercially available from Elf Atochem.

While thermoplastic resins are preferable for use herein, thermosetting resins may also be employed in the present invention.

Furthermore, it should be noted that the final stover wafer product disclosed herein, can be obtained without use of any resin.

Other Additives

Other optional ingredients may also be incorporated with the corn stover fibers which may facilitate processing and formation of the reconstituted stover wafer product and that may help maintain the desired appearance and physical properties. These additives include, but are not limited to, wetting agents, colorants, fire retardant additives, as well as other fibers for improving the strength and appearance of the product.

Optionally, fibers other than the corn stover fibers or bonding fibers described above may be incorporated into the composition to improve the physical properties such as strength and durability to improve the appearance of the final product. The type and amount of additive fiber used varies with the desired strength and end use of the stover wafer product.

Suitably, the optional additive fibers are long, for example in the range of about 0.75 to about 1.50 inches, are high strength, having a denier of about 15. Suitable additive fibers also easily intertwine with the stover fibers and/or bonding fibers so as to provide strength to the final product. Examples of suitable fibers include, but are not limited to, polyester, polyamide, polyethylene, acetate, rayon, cotton, mulch, dairy compost, yard waste compost, other compost, and other natural or synthetic fibers. Additive fibers are especially useful when the corn stover fibers and/or bonding fibers, for example, may be relatively short.

The optional fibers may be the same as or different than the bonding fibers, but may lack the adhesive coating, in the case of some bonding fibers.

One specific example suitable optional additive fiber product is the Trevira® polyester fiber 103, 15 denier, commercially available from Hoechst Celanese of Salsbury, N.C.

Another suitable commercially available additive fiber is Fybrel®-901 available from MiniFibers in Johnson City, Tenn. The addition of about 10 wt-% of the polyethylene product, Fybrel®-901 based on the total composition weight, for example, may provide a strong product that has increased durability when compared with the same product having no additive fiber.

A wetting agent may also be added during the blending process. A wetting agent may facilitate the complete dispersion of the resin throughout the mixture. Particular wetting agents are used and/or sold with particular types of resins. Preferably, the wetting agents are recyclable.

Fragrance agents and coloring agents, such as dyes, may also be added during a blending process in order to impart desired odor and color to the final product.

Dyes and coloring agents are known to those of skill in the art. Any suitable dyes or coloring agents known in the art may be employed herein.

In alternative embodiments, ingredients which impart water repellency to the final wafer product, such as waxes, may also be incorporated into the wafer product herein, such as during the blending process. Such ingredients may also be sprayed or brushed onto the product, or the product may be dipped in such ingredients.

It is understood that any components added to the composition should not interfere with the structural or physical integrity of the stover fibers. Furthermore, any components added to the composition desirably do not interfere with the bonding, of the polymers or resins, or the bonding fibers. Suitably, each component added to the composition is recyclable and/or biodegradable.

The components may be added to the stover fibers using any suitable method known in the art. One method is to blend the ingredients together in a mixing device, for example, such as a Waring® blender. It is desirable that the mixture be relatively uniform throughout.

Limited amounts of water may be added during the blending process in order to maintain the moisture level of the stover fibers at least at about 10 wt-% to about 25 wt-% of the stover fibers. It is most desirable to maintain a moisture content of about 15 wt-% for optimum processing and end results. However, it may be desirable to have a minimum amount of freestanding water in the mixing vessel; however the amount of water should not be sufficient to permit a slurry to form. It is less economical to form a slurry because of water removal and/or waste slurry disposal.

If the amount of moisture is greater, the time of blending may be increased to remove more water during this step. Suitable temperatures for use during the blending step may depend on the melting temperature of the ingredients added. In order to ensure evaporation of excess water, however, blending temperatures must be at least about 100° F.

In some embodiments, the stover fibers may form the largest part of the total composition by weight. Such amounts will vary depending on the end use of the stover wafer product formed herein. A minimum amount of the optional additive fibers including the bonding fibers or synthetic fibers described above may be used in order to ensure enough cohesion in the final wafer product.

Suitably the amount of stover fiber is about 50 wt-% to about 80 wt-% of the final wafer product. In one embodiment, between about 55 wt-% to about 65 wt-% of the stover fibers are employed.

Bonding fibers are suitably present in amounts of about 0 wt-% to about 20 wt-%, more suitably about 0 wt-% to about 10 wt-% of the final wafer product. In some embodiments, it may be desirable to employ more than 20 wt-% of the bonding fibers. In one embodiment, up to about 5 wt-% of polyester fibers having an adhesive coating thereon are employed.

After blending, the composition may be pelletized and then formed into a wafer product immediately, or the composition may be stored for a time prior to the forming process.

The resultant blended product may then be employed to form a final wafer product.

Figure 1:
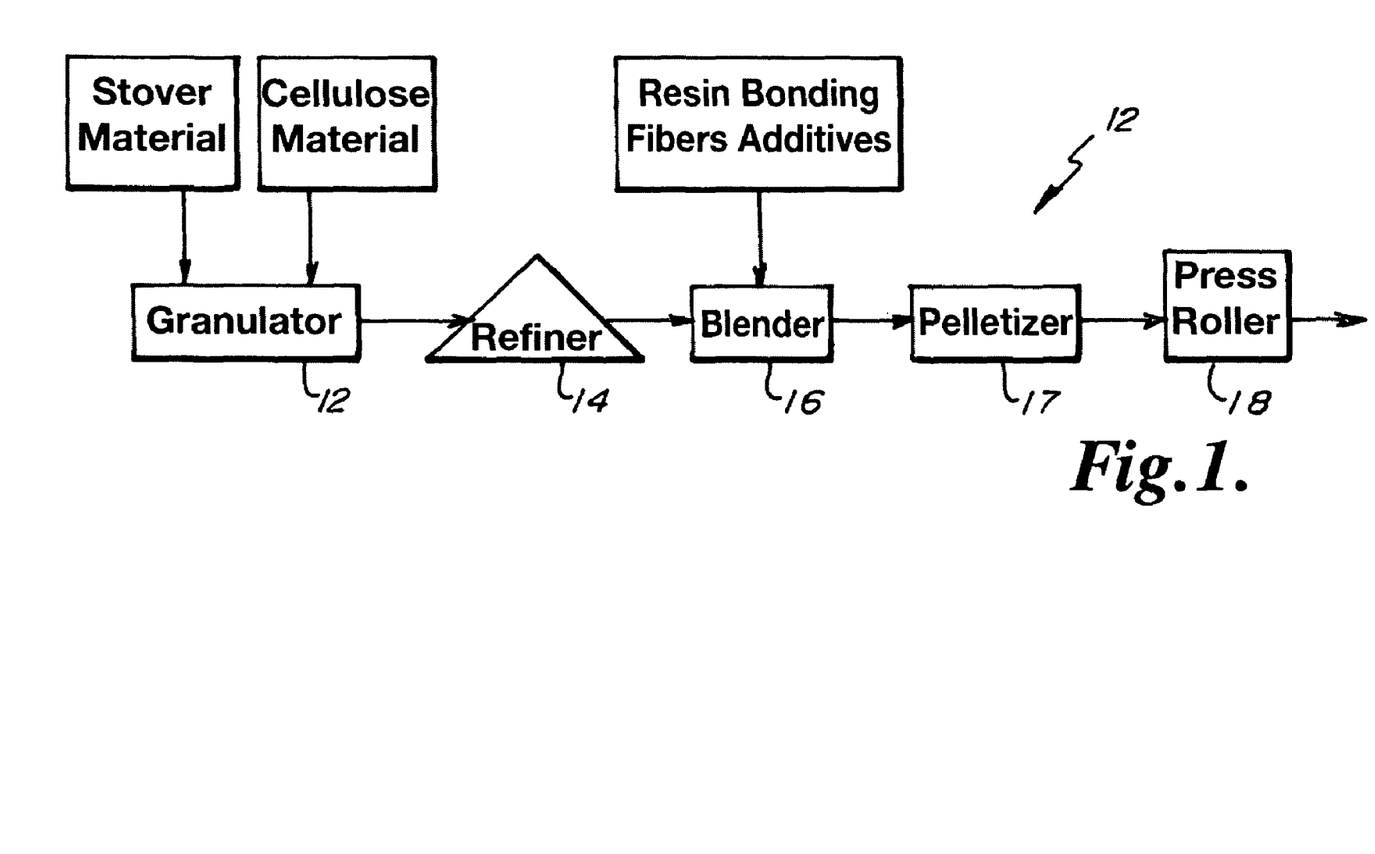
FIG. 1 is a flow chart illustrating one embodiment of a process which may be employed in making a compressed wafer according to the invention.
Figure 2:
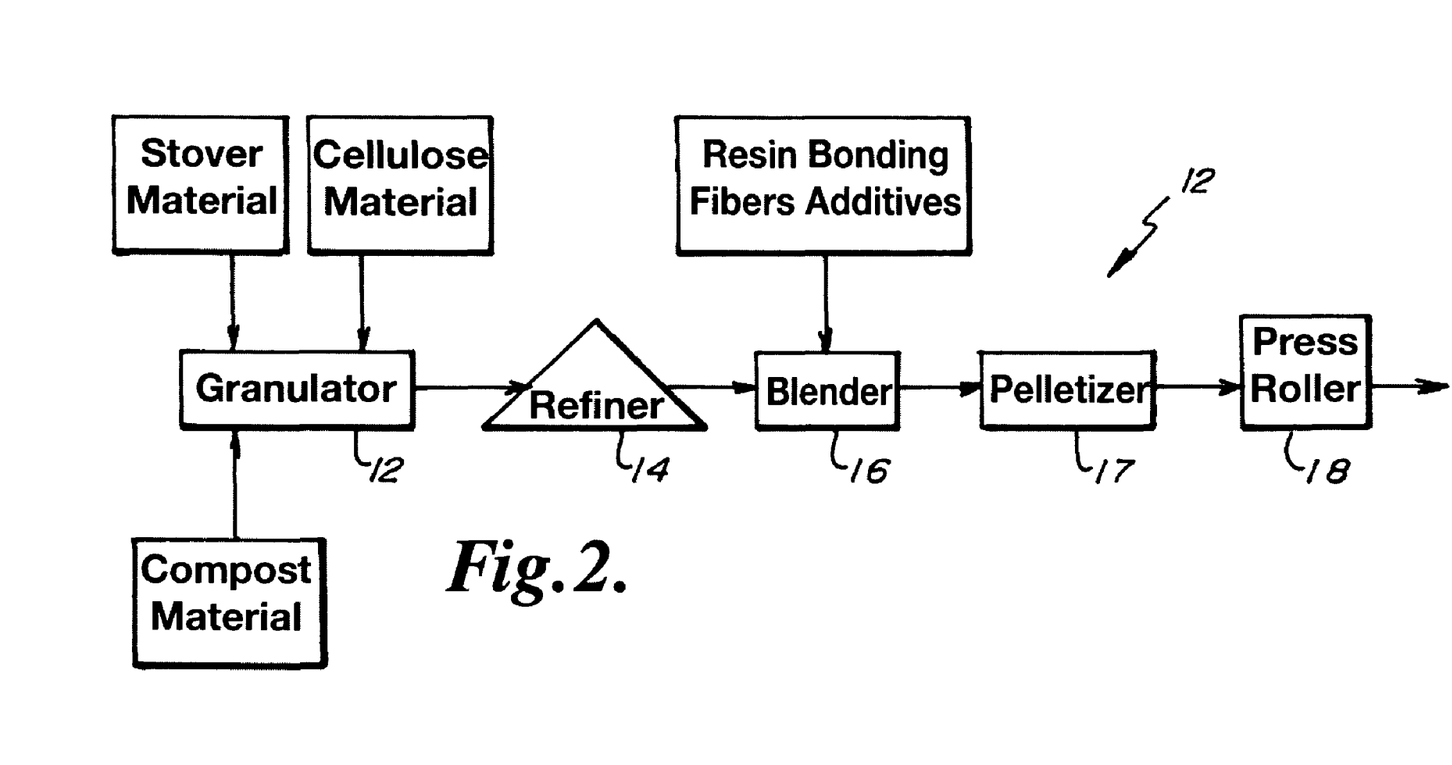
FIG. 2 is an alternative flow chart illustrating one embodiment of a process which may be employed in making a compressed wafer according to the invention.

Turning now to the figures, FIGS. 1 and 2 illustrate generally at 10, by way of a flow chart, alternative embodiments of a process of making a corn stover wafer product according to the invention.

Corn stover material can be initially reduced into fibers using any suitable means known in the art. In the embodiments shown, corn stover materials are placed in a granulator 12 which reduces the corn stover material into smaller parts for further processing by cutting. The raw corn stover materials may be transported in the form of enlarged bails for processing in the granulator 12. Upon exit from the granulator, the initially reduced corn stover material may be transported to a refiner 14 for further reduction. The initially reduced material may be transported from the granulator 12 to the refiner 14 using any suitable method known in the art. In one embodiment, the stover fiber materials are transferred by a conveyor system (not shown) from granulator 12 to refiner 14.

Suitably, if necessary, in addition to the conveyor system, any suitable method of imparting moisture to the initially reduced material is also employed. Thus, prior to entry of the initially processed stover materials into the refiner 14, the corn stover materials may be preheated and exposed to dry steam such that the moisture content of the corn stover material is approximately 50 wt-% to 60 wt-%.

In one embodiment, the corn stover material was heated to a temperature of about 250° F. Upon exit from granulator 12, the corn stover material/fibers may contain less than 15% moisture. Thus, if the conveyor system has the capability of imparting moisture to the stover materials as they are being transported from granulator 12 to refiner 14, then, if needed, moisture can be added to the stover fiber materials at this stage. Enough water should be added such that the moisture of the stover fiber materials entering the refiner 14 is at least 10% by weight.

The moisture content of a known sample stover material may be measured using a moisture meter, such as that commercially available from Denver Instruments as Model No. 1R-200.

Throughout the reduction process, it is desirable to retain at least about 10 wt-% to about 25 wt-% moisture in the fiber material. The increased moisture content and heat assists to breaks down the stover fibers and further retards the chance of charring or burning of the fibers in the refiner 14. Furthermore, the moisture facilitates reduction of the fibers without creating significant amounts of stover dust which can spontaneously combust. However, it is not desirable to have a sufficient volume of water to create a slurry. Creation of a slurry decreases the efficiency of the process because excess water and slurry waste must then be removed from the process.

Another method of transporting the material from the granulator to the refiner is by metering through an auger and feed system to establish a uniform weight of product prior to entering refiner 14.

It is desirably to maintain the temperature in the refiner between about 200° F. to about 300° F., and more preferably between about 220° F. and about 250° F. Temperatures of about 350° F. or more can result in a significant amount of the stover material charring or burning in the refiner 14.

Suitable refiners are those having metal plates wherein stover material parts are converted to fibers by destruction of the matrix around the fibers while maintaining fiber integrity. One example of a suitable commercially available refiner is available from Andritz, Sprout & Bauer of Springfield, Ohio.

In one embodiment, refiner 14 has two opposed metal plates that are applied to the stover material and rotated so as to tear the stover material apart, thereby releasing the fibers. Any suitable metal refining plates may be employed herein. Various size metal plates can be used depending upon the desired fiber size.

One example of commercially available refiner plates having suitable configuration are those available from Durametal Corporation (Tualaton, Oreg.) formed of C-20 alloy and having a #336 Circle with a 005/in. TRO taper (#30-36505-217).

Suitably, refiner 14 is operated at a temperature and mixing speed that is sufficiently high to permit the stover materials to be efficiently pulled apart, but the temperature and speed should not be so high as to cause the stover materials to burn, denature, or generate significant amounts of dust. Some water may be added to the stover parts during refining in order to maintain, or to insure, the moisture in the stover is maintained between about 10 wt-% and about 25 wt-%.

The temperature and mixing speed in refiner 14 may be adjusted to prevent dehydration of the stover. If too much water is added to the stover materials during the reduction process, however, stover dust can agglomerate or aggregate and clog the equipment, which may decrease the tendency for creating a uniform product. The refiner mixing speed varies with the volume of materials to be processed, the size and type of equipment used and the heat generated during mixing. Preferably, the mix speed is low enough that the intensity and strength of the stover material is preserved, and preferably, the mix speed is high enough so that processing time is minimized.

Upon exiting the refiner, if the moisture content of the stover fibers is greater than about 15 wt-% to about 25 wt-%, it may be desirable to expose the stover fibers to a dryer immediately upon exiting the refiner in order to reduce the moisture to a level of about 15 wt-% or so.

The dried stover fibers may then be bailed, bagged, and/or compressed for storage for further processing, or they may be immediately processed further. If drying is desired, the stover fibers may be transferred to any suitable equipment such as a heating unit and/or cyclone, to adjust the moisture level to between about 10 wt-% to about 25 wt-%. The heating unit should not be so warm that it burns or dehydrates the stover fiber. Any heating unit and/or cyclone known in the art may be used.

Alternatively, if the moisture level is below about 10% by weight, water may be added to the fibers prior further processing of the fibers. However, there should not be so much water added that the moisture of the stover is greater than about 25% by weight.

The stover fibers may then be transferred to a mixer, blender or other such suitable mixing vessel 16 for blending with other optional ingredients as desired such as compost, bonding fibers, resins and optionally other additives, as discussed above. Suitable mixing vessels include any standard high shear mixing vessel. One example of a suitable mixing vessel which can be employed herein is a Waring® blender. The mixing action provided by a Waring® blender does not destroy the integrity of the stover fibers yet provides enough mixing of the various ingredients to provide a homogenous mixture. Speeds of about 300 rpm's have been found to be suitable for use herein. Mixture time can vary depending on the type of mixing vessel employed. When using a Waring® blender, adequate mixing can be obtained in as little as about 1 minute to about 3 minutes.

The resultant mixture is a substantially dry mixture in that a slurry is not formed. Some water may be added during the blending step in order to maintain a moisture content in the stover fibers of about 10 wt-% to about 25 wt-%, but not so much that there is standing water in the blender and not so much as to form a slurry. If too much water is present, the time of the blending step may be increased so as to evaporate water. A temperature of at least about 100° F. may be required to efficiently remove water.

The wafer may be employed for revegetation, erosion control, for livestock blankets, and in greenhouses and nurseries for potting plants and for bare root trees, shrubs and plants, for example.

Examples

A lab analysis performed for Mat, Inc. by CLC Labs, 325 Venture Drive, Westerville Ohio 43081 on Oct. 21, 2004, report reference no. 2026.014 shows a corn stover and paper mulch pellet sample as having a 141:1 carbon to nitrogen ratio. The higher the carbon content, the less the product borrows nutrients from the soil as it degrades.

The results were as follows:

| TEST | RESULTS (%) |
| --- | --- |
| Nitrogen, total | 0.23 |
| Phosphorous, total/ | 0.03 |
| as P2O5 | 0.06 |
| Potassium, total/ | 0.25 |
| as K2O | 0.30 |
| Carbon-to-Nitrogen Ratio | 141:1 |
| Moisture* | 8.93 |

*Results reported on an as received moisture basis.

The ratio of the weight of organic carbon to the weight of total nitrogen in a soil or in an organic material is obtained by dividing the percentage of organic carbon (C) by the percentage of total nitrogen (N). The carbon to nitrogen ratio is the property of the soil that determines how fast litter decomposes. The carbon to nitrogen ratio can be used to determine if a compost is nitrogen stable. Composts derived primarily from wood by-products have high carbon to nitrogen ratios unless additional nitrogen is added during the composting process. Biosolids and manures generally have low carbon to nitrogen ratios since these materials are nitrogen rich. In general, a carbon to nitrogen ratio of 35 or lower is preferred if the material is claimed to be nitrogen-stabilized. At higher carbon to nitrogen ratios, nitrogen can be tied as the compost further decomposes. Nitrogen is then less available to plant material, and high levels of nitrogen fertilization are required to maintain optimum plant color and growth. Products with low carbon to nitrogen ratios (less than 20) can supply significant quantities of nitrogen as they decompose.

The blended corn stover, paper mulch, and/or compost material may include other additives following mixing, where the blended material may be transported to the pelletizing equipment by gravity feed, belt conveyor, screw auger, air feed systems, and/or any other standard transport equipment.

The corn stover, paper mulch, and/or compost pellet may be formed using any desired pelletizing equipment which is standard and/or common in the industry. Commercial pelletizing machines are frequently rotary pelletizing machines which form suitable pellets which in turn may be processed according to the invention described herein.

In general, the pelletizing equipment should utilize a compression ratio of between about 1:1 to about 7:1 during the pellet formation process. The use of a compression ratio as described herein provides a suitable pellet for further processing which minimizes fracture and/or fines. The formed pellet size for the corn stover, paper mulch, and/or compost pellet may be between $1/8^{th}$ inch and $3/8^{ths}$ inches. In alternative embodiments, larger or smaller pellet sizes may be desirable dependent upon the final size of the wafer product.

Generally, a warm pellet as exiting the pelletizing equipment immediately enters the wafering process. Proper wafer formation generally occurs when the pellets retain the internal heat generated by the compression forces of the pelletizing equipment immediately prior to "wafering".

The compression ratio for the pelletizing equipment should be matched to the desired pellet size for proper pellet formation. The compression level selected for the pelletizing equipment should be sufficient to maintain pellet shape to produce warm malleable pellets. Heat may be generated within the corn stover, paper mulch, and/or compost product due to the exposure to high compression during the pelletizing process. Generally, as pellets cool following the pelletizing process, the pellets become harder and more brittle. Therefore, the wafering process for the pellet is optimally performed while the pellets are warm and malleable as opposed to being cool, hard, and/or brittle.

The moisture content of the corn stover, paper mulch, and/or compost pellet is preferably between about 5 wt-% to 20 wt-%. A moisture level below 5 wt-% generally reduces the formation of pellets due to fracture, resulting in an unacceptable level of fines.

Generally, the blended corn stover, paper mulch, and/or compost material prior to pelletizing has a temperature of about 80° F. to about 150° F. The corn stover, paper mulch, and/or compost pellets after pelletizing have a temperature of about 150° F. to about 180° F.

The corn stover, paper mulch, and/or compost pellets may then be transported by gravity feed, belt conveyor, screw auger, air feed systems, or any other suitable transport equipment to a commercial feed mill press roller utilizing flat rollers for processing of the pellets into the commercial AG wafer product.

The process utilized for pressing the corn stover, paper mulch, and/or compost pellets into wafers is a standard or normal operation for a press roller, with the exception of the substitution of flat and smooth rollers for the standard knurled or fluted rollers. As the pellets pass through the flat and smooth rollers the pellets are compressed into the flattened "wafer" shape. The wafering process in the press rollers preferably fractures or flattens the compressed pellet into a shape exhibiting enhanced performance characteristics as compared to a standardized pellet. The partial fracturing of the compressed pellets into wafers enables water to be more easily and rapidly drawn for absorption by the wafer during agricultural use. The wafering process increases and improves mulch performance through rapid water absorption, which in turn facilitates the rate of decomposition of the wafers to deliver nutrients into surrounding soil promoting plant growth. The corn stover, paper mulch, and/or compost wafer decomposes at a faster rate, as compared to a compressed pellet, thereby maximizing plant growth.

The regulation of the moisture content and the internal temperature of the pellets are some of the factors which prevent the wafer process from excessively crumbling or fracturing the processed pellets. Pellets which lack moisture and a desired temperature tend to completely fracture resulting in the absence of a desired wafer shape.

During the wafering process the commercial feed mill press roller has a compression gap of between about 10% to about 80% of the original pellet size. The corn stover, paper mulch, and/or compost pellets entering the mill press roller equipment generally have a pellet size of between about $1/8^{th}$ inch and $3/8^{ths}$ inch. The corn stover, paper mulch, and/or compost wafer exiting the mill press roller equipment is generally about 30% to about 200% larger in size as compared to the original preprocessed pellet.

Generally once the wafers exit the feed mill press roller, the wafers are permitted to cool, whereupon the wafers are packaged, labeled, and/or stored for future use in agricultural applications.

Following the processing by the mill press roller equipment the wafers may be transported through the use of gravity feed, belt conveyors, screw augers, air feed systems, and/or any other suitable transport means for packaging, labeling, and storage.

Generally the processed wafers exiting the mill press rollers have a temperature of approximately 180° F. The moisture level of the corn stover, paper mulch, and/or compost pellets before wafering is approximately about 5% to about 20%. The moisture level of the corn stover, paper mulch, and/or compost wafers following processing by the mill press rollers is approximately about 10% to about 12%. Generally, wafers having a moisture level of about 10% to about 12% are sufficiently moist to not fracture during the formation, transportation, packaging, and/or spreading of the wafers for use in agricultural applications.

The above disclosure is intended to be illustrative and not exhaustive. This description will suggest many variations and alternatives to one of ordinary skill in this art. All of these alternatives and variations are intended to be included within the scope of the attached claims. Those familiar in the art may recognize other equivalents to the specific embodiments described herein which equivalents are also intended to be encompassed by the claims attached hereto. The various elements shown in the individual figures and described above may be combined or modified for combination as desired.

The invention claimed is:

1. A mulch comprising:
   a compressed wafer, said wafer comprising fibers, said fibers comprising;
   corn stover fibers; and
   paper fibers.

2. The mulch of claim 1 further comprising compost.

3. The mulch according to claim 1, wherein about 50% to about 60% of said fibers have a length between about 0.25 inches and about 0.50 inches.

4. The mulch of claim 3 wherein said compost is selected from the group consisting of yard waste, straw, hay, manure and mixtures thereof.

5. The mulch of claim 3, said mulch comprising about 25% compost.

6. The mulch of claim 3, further comprising a binder in an amount of about 1% to about 5%.

7. The mulch of claim 6, the mulch comprising about 3% binder, about 25% paper fibers and about 73% corn stover fibers.

8. A mulch comprising:
   a compressed wafer, said wafer comprising;
   fibers and compost, said fibers comprising;
   corn stover fibers.

9. The mulch of claim 8 wherein said compost is selected from the group consisting of hay, manure, wood fibers, straw, leaves, grass clippings and mixtures thereof.

10. The mulch of claim 8 said mulch comprising about 25% compost and about 75% corn stover fibers.

11. The mulch according to claim 10, wherein about 50% to about 60% of said fibers have a length between about 0.25 inches and about 0.50 inches.

12. A method of making mulch, the method comprising the steps of:
    providing corn stalk material;
    defibrating the corn stalk material to form corn stover fibers;
    mixing the corn stover fibers with at least one member selected from the group consisting of paper fibers and compost or both, and mixtures thereof into a mulch;
    pelletizing the mulch; and
    compressing the pelletized mulch into a wafer.

13. The method of claim 12 further comprising mixing with said corn stover fibers, at least one member selected from the group consisting of polymers, tackifying resins, bonding fibers, waxes, wetting agents, colorants, perfumes, inoculants, preservatives, fire retardants, synthetic fibers, other natural fibers, acetate, rayon, cotton, leather, wool, coconut, kanaffe, jute and mixtures thereof.

14. The method of claim 12, said mulch comprising compost, said compost comprising at least one member selected from the group consisting of soy bean straw, oat hulls, alfalfa, yard waste, dairy waste and mixtures thereof.

15. The method of claim 12 wherein said defibrating is thermomechanical.

16. The method of claim 12 wherein said method is a substantially dry method of making said wafer.

17. The method of claim 16 wherein said corn stover fibers have a moisture content of less than about 25% by weight of said corn stover fibers.

18. The method of claim 17 wherein said corn stover fibers have a moisture content of about 10% by weight to about 15% by weight of said corn stover fibers.

19. The method of claim 16, said mulch comprising about:
    about 50 wt-% to about 75 wt-% corn stover fibers;
    0 wt-% to about 50 wt-% compost;
    0 wt-% to about 25 wt-% paper fibers; and
    0 wt-% to about 5 wt-% polymer;
    wherein said compost, said paper fibers or both are not less than 25 wt-% of the total compressed wafer.

20. The method of claim 19, said mulch comprising about 20 wt-% to about 30 wt-% compost.

* * * * *